(12) United States Patent
Klausen et al.

(10) Patent No.: US 10,693,719 B2
(45) Date of Patent: Jun. 23, 2020

(54) CENTRALIZED CONTROLLING SYSTEM CONTROLLING INTERACTIONS AND COOPERATION BETWEEN RADIO-OPERATED DEVICES OPERATING IN A MESH NETWORK SUPPORTING MULTIPLE RADIO COMMUNICATION PROTOCOLS

(71) Applicant: VITIR AS, Drammen (NO)

(72) Inventors: Glenn Ivar Klausen, Drammen (NO); Hallvard Moholdt, Sollihøgda (NO)

(73) Assignee: VITIR AS, Drammen (NO)

( * ) Notice: Subject to any disclaimer, the term of this patent is extended or adjusted under 35 U.S.C. 154(b) by 0 days.

(21) Appl. No.: 15/745,260

(22) PCT Filed: Jul. 15, 2016

(86) PCT No.: PCT/NO2016/050161
§ 371 (c)(1),
(2) Date: Jan. 16, 2018

(87) PCT Pub. No.: WO2017/014645
PCT Pub. Date: Jan. 26, 2017

(65) Prior Publication Data
US 2018/0212826 A1 Jul. 26, 2018

(30) Foreign Application Priority Data

Jul. 17, 2015 (NO) .................................... 20150929
Oct. 29, 2015 (NO) .................................... 20151471

(51) Int. Cl.
*H04L 12/24* (2006.01)
*H04L 12/46* (2006.01)
*H04L 29/06* (2006.01)
*H04W 84/18* (2009.01)
*H04W 40/12* (2009.01)

(52) U.S. Cl.
CPC ...... *H04L 41/0816* (2013.01); *H04L 12/4625* (2013.01); *H04L 69/18* (2013.01); *H04W 40/12* (2013.01); *H04W 84/18* (2013.01); *Y02D 70/142* (2018.01); *Y02D 70/144* (2018.01);
(Continued)

(58) Field of Classification Search
None
See application file for complete search history.

(56) References Cited

U.S. PATENT DOCUMENTS

| | | | |
|---|---|---|---|
| 2006/0215581 A1* | 9/2006 | Castagnoli | H04L 41/0663 370/254 |
| 2006/0215583 A1* | 9/2006 | Castagnoli | H04L 45/02 370/254 |

(Continued)

*Primary Examiner* — Otis L Thompson, Jr.
(74) *Attorney, Agent, or Firm* — Wenderoth, Lind & Ponack, L.L.P.

(57) ABSTRACT

A mesh network (120) constituted by radio-controlled bridges (101, 102, 103, 104, 105, and 106) in communication with connectionless devices (109) and connection-oriented devices (110) is disclosed. The mesh network (120) is further configured with a plurality of communication protocol translators facilitating communication between devices using different communication protocols. The mesh network (120) is further configured with a central controlling unit (100) controlling allowed and not allowed interactions between devices communicating over the mesh network (120).

21 Claims, 13 Drawing Sheets

(52) U.S. Cl.
CPC ............ *Y02D 70/162* (2018.01); *Y02D 70/22* (2018.01); *Y02D 70/34* (2018.01)

(56) References Cited

U.S. PATENT DOCUMENTS

| | | | | |
|---|---|---|---|---|
| 2007/0038743 A1* | 2/2007 | Hellhake | ........... | H04L 29/12283 709/224 |
| 2008/0112363 A1* | 5/2008 | Rahman | ................ | H04W 8/005 370/331 |
| 2010/0202345 A1* | 8/2010 | Jing | .................... | H04L 12/2832 370/328 |
| 2010/0214959 A1* | 8/2010 | Kuehnel | ........... | H04L 29/12264 370/255 |
| 2010/0214979 A1* | 8/2010 | Kuehnel | ................ | H04L 41/00 370/328 |
| 2010/0217655 A1* | 8/2010 | Kuehnel | ................ | G06Q 30/02 705/14.4 |
| 2011/0188516 A1* | 8/2011 | Borleske | .................... | H04J 3/24 370/474 |
| 2012/0092984 A1* | 4/2012 | Mighani | ............... | H04W 84/00 370/221 |
| 2014/0269487 A1* | 9/2014 | Kalkunte | .............. | H04L 49/201 370/312 |
| 2014/0362729 A1* | 12/2014 | Michaud | ............... | H04W 16/26 370/254 |
| 2015/0071163 A1* | 3/2015 | Mackie | .................... | H01Q 9/18 370/315 |
| 2015/0263863 A1* | 9/2015 | Kalkunte | ................ | H04L 12/18 370/252 |
| 2016/0094398 A1* | 3/2016 | Choudhury | ............. | H04L 45/42 370/254 |
| 2016/0344699 A1* | 11/2016 | Baldwin | ............... | H04W 76/18 |
| 2018/0249535 A1* | 8/2018 | Seo | ........................ | H04W 48/18 |
| 2018/0309593 A1* | 10/2018 | Dong | .................. | H04L 12/4625 |
| 2018/0332443 A1* | 11/2018 | Novo Diaz | ............. | H04W 4/70 |
| 2019/0029068 A1* | 1/2019 | Sturek | .................... | H04L 61/20 |

* cited by examiner

| DEVICES | ATTRIBUTES | | | | | | | | | INTERCONNECTIONS |
|---|---|---|---|---|---|---|---|---|---|---|
| | PROTOCOL | DEVICE TYPE | LOCATION | DEVICE ID | RSSI | SEQUENTIAL LOAD SWITCHING | BRIDGE ID | ATTRIBUTE N | ATTRIBUTE M | IP v6 ADDR | |
| D1 | P1 | T2 | A | 1 | -38 | | B1 | Nn | Mn | 2001:db8:a0b:12f0::1 | D2 |
| D2 | P2 | T4 | B | 2 | -87 | 1 | B2 | Nn | Mn | 2001:db8:a0b:12f0::2 | D1, D6, D7 |
| D3 | P4 | T1 | C | 3 | -56 | | B4 | Nn | Mn | 2001:db8:a0b:12f0::3 | |
| D4 | P2 | T2 | A | 4 | -98 | 3 | B2 | Nn | Mn | 2001:db8:a0b:12f0::4 | D8 |
| D5 | P3 | T3 | A | 5 | -78 | | B3 | Nn | Mn | 2001:db8:a0b:12f0::5 | D7, D2 |
| D6 | P1 | T5 | B | 6 | -90 | | B1 | Nn | Mn | 2001:db8:a0b:12f0::6 | |
| D7 | P5 | T3 | D | 7 | -62 | 2 | B5 | Nn | Mn | 2001:db8:a0b:12f0::7 | D4, D2 |
| D8 | P1 | T5 | E | 8 | -74 | | B6 | Nn | Mn | 2001:db8:a0b:12f0::8 | D5 |
| ...... | | | | | | | | | | | |
| Dn | Pn | Tn | N | n | -32 | | | Nn | Mn | 2001:db8:a0b:12f0::n | |
| Dn+1 | Pn+1 | Tn+1 | Nn+1 | n+1 | -39 | | | Nn+1 | Mn | 2001:db8:a0b:12f0::n+1 | |

Example of Prior Art
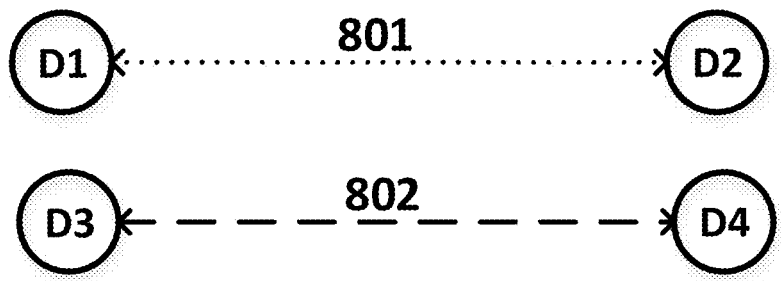
Example of An Embodiment
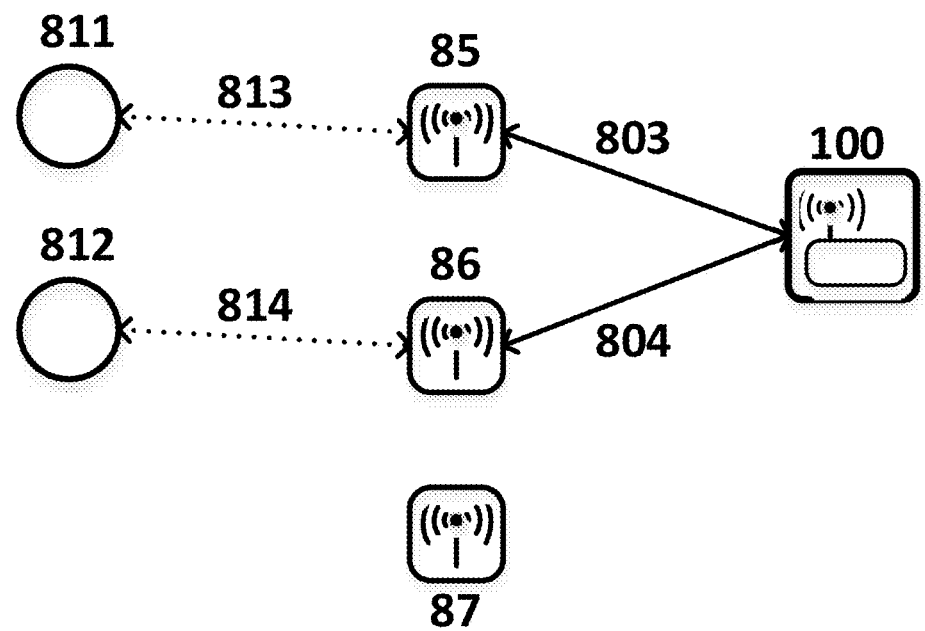
Figure 8a

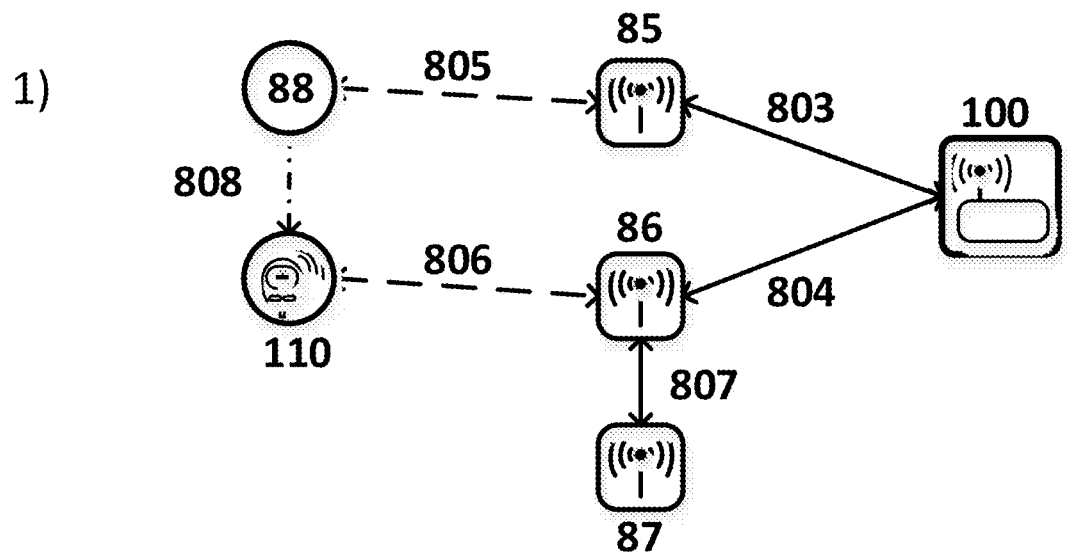
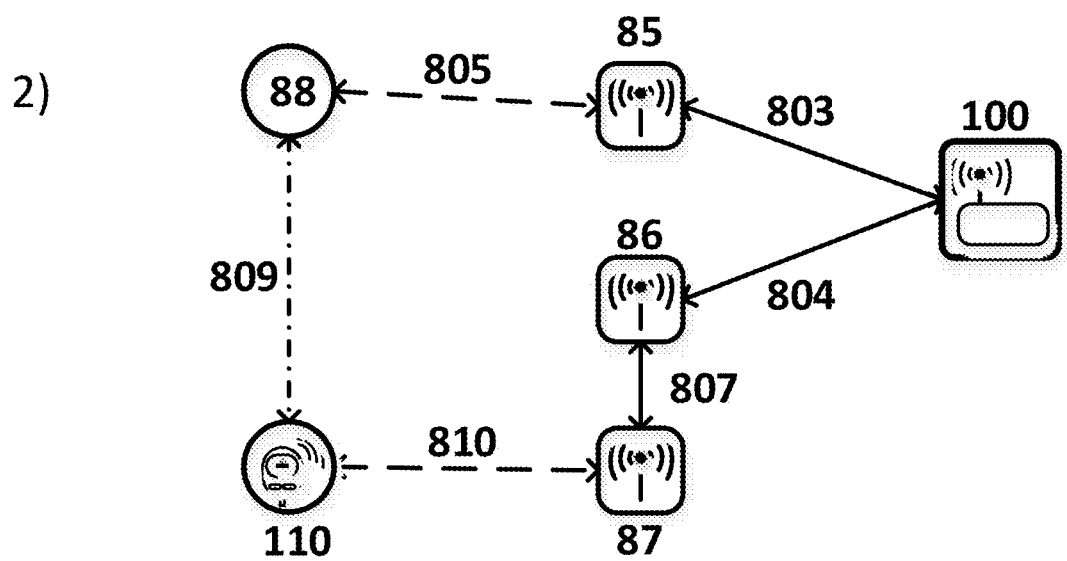
Figure 8b

| 60 | 61 | 62 | | | | | | | | | 64 |
|---|---|---|---|---|---|---|---|---|---|---|---|
| DEVICES | | ATTRIBUTES | | | | | | | | | INTERCONNECTIONS |
| | | PROTOCOL | DEVICE TYPE | LOCATION | UNIQUE ID | RSSI | SEQUENTIAL LOAD | Bridge | Subtype | Operation Type | PWM Range | |
| Movement Sensor | | KNX RF | LSW | BR | 901 | -38 | N/A | 103 | PB | On/Off | N/A | 902, 903, 904, 906 |
| Downlight | | BLE | ILL | BR | 902 | -87 | N/A | 104 | DL | Dim | 0 - 100 | |
| Downlight | | BLE | ILL | BR | 903 | -56 | N/A | 104 | DL | Dim | 0 - 100 | |
| Ligth Bulb | | Z-Wave | ILL | BR | 904 | -98 | N/A | 106 | LB | On/Off | N/A | |
| Water Monitor | | KNX RF | SEN | BAT | 905 | -67 | N/A | 103 | LM | Sensoring | N/A | 116 |
| Water Irrigation System Valve | | WMBUS | ACT | OUT | 906 | -87 | N/A | 101 | VAL | Open/Close | N/A | |
| Water Meter | | WMBUS | MET | BAS | 109 | -77 | N/A | 101 | WM | Data Harvesting | N/A | 115, 116 |
| Smart Unit | | BLE | SU | LIR | 116 | -65 | N/A | 100 | TAB | User Interface | N/A | |

| | | | | | | |
|---|---|---|---|---|---|---|
| ILL | Illuminator | BR | Bedroom | PB | Push button |
| LSW | Light Switch | BAT | Bathroom | DL | Downlight |
| SEN | Sensor | OUT | Outdoor | LB | Light Bulb |
| ACT | Actuator | BAS | Basement | LM | Leakage Monitor |
| MET | Metering device | LIR | Livingroom | VAL | Valve |
| SU | Smart Unit | | | WM | Water Meter |
| | | | | TAB | Tablet |

Figure 11

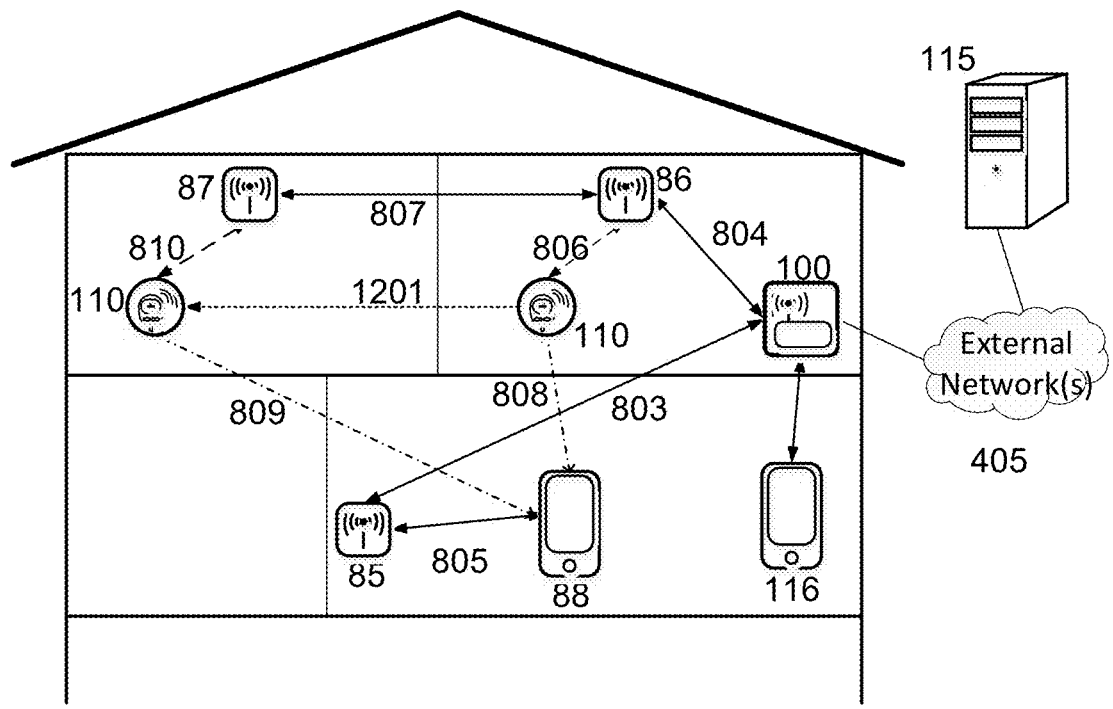

Figure 12

CENTRALIZED CONTROLLING SYSTEM CONTROLLING INTERACTIONS AND COOPERATION BETWEEN RADIO-OPERATED DEVICES OPERATING IN A MESH NETWORK SUPPORTING MULTIPLE RADIO COMMUNICATION PROTOCOLS

A centralized controlling system controlling interactions and cooperation between radio-operated devices operating in a mesh network supporting multiple radio communication protocols.

TECHNICAL FIELD

The present invention relates to control of radio operated electronic devices used in telemetry and automation systems, and especially to a centralized controlling system providing interoperation, cooperation and exchange of data between devices operating in a mesh network constituted by wireless bridges.

BACKGROUND

In prior art it is known that the interoperation and cooperation between radio operated devices in wireless networks is constrained by many parameters and design issues, like differences in electronic interface standards, communication protocols, radio frequencies, public regulations and legislations and vendor-specific implementations. Some classes of devices and their protocols are usually designed for use in specific fields of applications, for example within a private home environment, in metering applications, welfare technology or as part of a wireless "Internet of everything".

Radio communication protocols can be divided in some major classes: open standards like the ones defined in European Norms (EN standards, e.g. KNX RF and Wireless M-Bus), and industry standards driven by consortiums or special interest groups (e.g. ZigBee, Bluetooth, Z-Wave and Thread). There are also other vendor-defined protocols, which may or may not have been released into the public domain (e.g. NEXA by ARC Technology). The regulating authorities behind these different protocols will normally not take any actions facilitating interoperability or cooperation between devices with different radio communication protocols, but focus on the development and deployment in the market of their own specific standards. Further, suppliers of radio-operated devices may find it commercially beneficial to introduce a new protocol instead of utilizing existing standards.

From a user perspective, these interoperation limitations appear often as being artificial and represent a problem for optimum usage of commercially available systems and devices. The users are very heterogeneous and so are their fields of application and requirements, but one common problem is that they find themselves constrained by these limits and may have to purchase solutions from several vendors operating in parallel.

Some protocols can utilize battery-less technology, using e.g. the kinetic energy in a button push, as for example certain KNX RF based switches, to transmit short burst of data. Other protocols need more energy to complete wireless data exchange and are more suitable for use with battery- or mains power supply.

Interoperation between radio-operated devices even within open standards is further challenged by norms issued by local authorities within given geographical regions matching local regulations. Examples of protocols that have adopted such local regulations are KNX RF and Wireless M-Bus. Examples are for instance:

KNX RF defines different frequencies. In Australia KNX RF uses 433 MHz while in Europe both 433 MHz and 868 MHz frequencies are used. Using KNX RF devices from an Australian vendor requires a 433 MHz based system, while the most commonly used frequency used by European vendors are 868 MHz The user may install either parallel systems, or systems, which support both frequencies in order to utilize devices from both regions.

Wireless M-Bus defines a different set of modes, which cannot interact due to differences in the physical layers of the radio devices. For instance, T-mode in Australia defines 433 MHz while T-mode in Europe defines 868 MHz.

Even for devices using a same communication protocol, interoperation like for example a device switching on another device, may not be possible due to vendor specific attributes, implementations or ambiguous definitions in a specific standard. An example of such a standard is for example ZigBee based devices where vendors often define their own private device profile, preventing devices from other vendors to interoperate or cooperate with their devices.

A common limitation of many widely used RF protocols is that they only support interoperation with devices communicating with a same protocol through direct logical operational conformity between devices being within a specific physical radio range of each other, and supporting only point-to-(multi)point network topology for example. Transmission of radio packets from the devices is often limited to one or a few hops even when routers are introduced into a wireless network.

In prior art it is known how to arrange translation of radio communication protocols. For example, US20030158954 A1 discloses a method and apparatus for facilitating radio communications between communications systems operating on different communications protocols. The process involves receiving a first communication signal, translating the communication signal from a first protocol to a second protocol, and re-transmitting the communication signal. The communications protocols can include at least one of a data format, data timing system, coding scheme, transmission mode, and carrier frequency. A software-defined translator can be configured for receiving the communication signal, performing the protocol translation, and re-transmitting the communication signal.

US 2013/0114582 A1 disclose a method of operating a wireless mesh network system having a first wireless mesh network device supporting a first wireless mesh network device protocol. An application according to the method is supporting a second wireless mesh network device protocol, and a driver translates between the application's second wireless mesh network device protocol and the first wireless mesh network device protocol such that the application can exchange data with the first wireless mesh network device. A gateway is providing an interface to the first wireless mesh device while an application platform coupled to the gateway is supporting the second wireless mesh network device.

Another example of prior art is TI CC1350, which can be a bridge comprising a radio communication protocol translator. A description of the integrated circuit is found from the link http://www.electronicsweekly.com/news/products/micros/tiredesigns-wireless-mcus-ground-2015-02/. The circuit can handle two radios, hence operate as a bridge, but is limited to handle one radio at a time. Therefore, the bridge selects one of the two protocols before switching to the other one of the two protocols.

Therefore, there is a need of an improved radio communication system providing protocol translation between different radio communications protocols that at the same time controls and facilitate interoperation and cooperation between devices in interconnecting radio networks. It is also a need of providing a possibility to extend radio communication ranges between radio devices being located outside defined physical radio communication ranges of specific standards.

OBJECT OF THE INVENTION

In particular, it may be seen as an object of the present invention to provide a radio communication network that overcome the problems of the prior art by
- arranging a centralized controlling system controlling possible interactions between radio controlled devices operating on a same communication protocol,
- or on different communication protocols,
- extending the operational range of existing and new protocols,
- resolving possible interference problems by physical distribution of radio transceivers,
- wherein interoperability or cooperation between devices is defined by a set of rules controlled by the centralized system, providing dynamical updating of bridges and roaming of devices in the mesh network.

It is a further object of the present invention to provide an alternative to the prior art.

SUMMARY

Thus, the above described object and several other objects are intended to be obtained in a first aspect of the invention by providing a centrally controlled radio communication system comprising radio controlled connectionless, and connection-oriented devices providing wireless communication over a mesh network,
- wherein the mesh network is constituted by a plurality of radio controlled bridges, wherein the respective bridges comprises a first radio controlled communication port in communication with the mesh network, and a second radio controlled communication port in communication with at least one connectionless device, or at least one connection-oriented device, wherein the respective bridges further is configured with a communication protocol translator enabling communication over the mesh network between different devices using optionally different communication protocols,
- a central controlling unit being connected in one point to the mesh network is configured to control allowed and not allowed interactions between devices communicating with each other over the mesh network.

FIGURES

The system according to the present invention will now be described in more detail with reference to the accompanying figures. The figures illustrate examples of embodiments of the present invention and are not to be construed as being limiting to other possible embodiments falling within the scope of the attached claim set. Further, respective examples of embodiments may each be combined with any of the other examples of embodiment.

FIGS. 8a, 8b and 8c illustrate an example of extending radio range and roaming of radio-controlled devices in the example of embodiment illustrated in FIG. 1.

FIG. 11 illustrates the interconnections and device attributes in the IM 60 for the example in FIG. 9.

FIG. 12 illustrates an example of a building with roaming of BLE devices.

DETAILED DESCRIPTION

Figure 1:
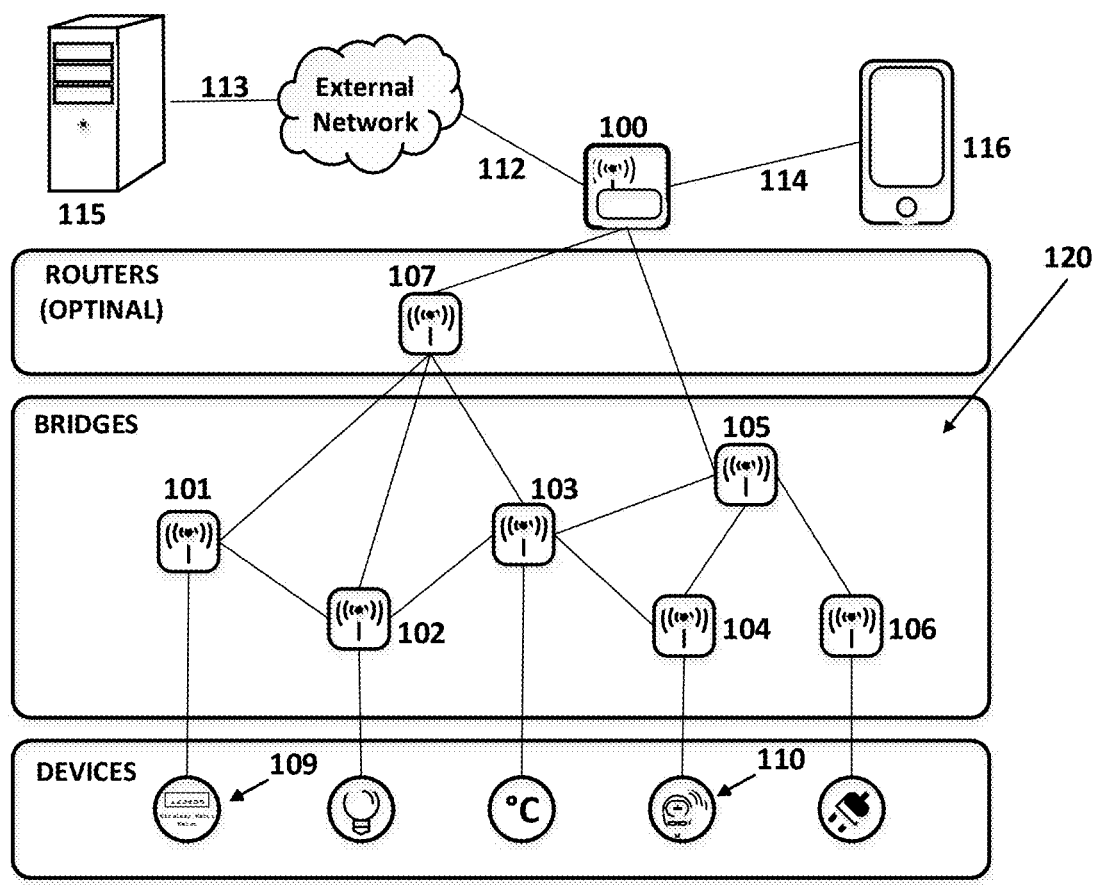
FIG. 1 illustrates an example of embodiment of the present invention.

Using a smart home system as an example, it would be beneficiary if numerous different devices, operating over various RF protocols, could interoperate and cooperate. For example: an owner of a house is travelling, and has set the smart house system in "away" mode using a smart unit (for example a tablet) connected to the Internet. When the system enters "away" mode, the system may be configured to apply extra security measures like activation of extra door locks etc. A movement detector may detect a burglar entering the house through a window. The system will then turn on all lights, notify a connected security alarm central, and to make matters worse for the burglar, turning on the water irrigation system of the lawn around the house.

The experience of a burglar may often trigger the owner of the house to install additional security devices in the house, and for example install new window glass-crushing detectors, which may operate over a protocol not yet supported by the system already installed in the house. Then it may be necessary to install a second system in the house just to support the extra security devices.

Another example of integration of different heterogeneous wireless functional devices into a common operated system is found within welfare technology, wherein a system providing local handling and secure distribution of personal connected health devices, and or data from body-worn sensor devices, should also support environmental control of building parameters like air quality, illumination and temperature.

According to an aspect of the present invention, interoperation and cooperation of radio-operated devices, which may operate with different radio communication protocols, can be facilitated using a common mesh backbone network. The mesh network may comprise multiple converter devices configured to provide specific protocol translation from/to the protocol of the mesh network, and to/from protocols of RF devices in communication with the converter device, utilizing the specific RF protocol the converter device is supporting. An important aspect of the present invention is to use the converter devices as bridges and constitute the mesh network by distributing bridges physically around on locations or inside houses etc. wherein the mesh network is to be installed. Therefore, the plurality of bridges are forming the mesh network, and is providing protocol translations between the mesh network protocol used in the mesh network and respective protocols utilized by specific devices. A system according to the present invention utilize distributed protocol translation configured in mesh network bridges instead of for example centralized protocol translation in a centralized computer or controller system.

With reference to the example above, the glass-crushing sensors can be integrated with other devices in a system according to the present invention just by adding a bridge in the mesh network supporting the new protocol. A further aspect of this solution is that adding a new bridge, i.e. a device, contributes to the healing of the mesh network since further communication paths are introduced into the mesh network. Therefore, combining a bridge and a corresponding connected device increases the robustness of the mesh network instead of decreasing the capacity of the network.

However, a protocol translation is usually not enough to enable interoperation or cooperation between devices in a network. In a sense, two devices that can interoperate or cooperate has to be designed to be able to do so, i.e. having direct logical operational conformity between them. Further, a specific command sent from a first RF device with a first RF protocol to a second RF device with a second RF protocol will enable the command to be received by the second RF device. However, the action associated with the command may not be among the commands the second device is designed to interpret or execute, or out of some reason is not allowed to execute. However, this does not exclude the possibility that the first RF device may issue another command that the second RF device can interpret. Devices that can operate within this concept are denoted complementary devices. It is still further possible to translate a command into a sequence of commands that in sum will provide the intended action of the command. Such translations of a command are within the concept and scope of devices having direct logical operational conformity between them. The concept of complementary devices and/or devices having direct logical operational conformity between them is denoted as interconnection between devices. It is further important to understand that an interconnection could be at a semantic level and may be an allowed interconnection or a forbidden interconnection.

According to another aspect of the present invention, a centralized controlling device or system, for example a computer system, is in communication with the mesh network. When adding a bridge to the mesh network, and thereby merges a new protocol into the mesh network, the central controlling unit may be configured with the required functionality for interconnecting the new devices connected to the added bridge with existing devices in the network.

In an example of embodiment of the present invention, a protocol converter is implemented as a software component in a radio controlled network bridge having a first interface port connecting to the mesh network and the mesh network protocol, and a second port connecting to a radio operated device using a specific radio communication protocol. In a mesh network according to the present invention the mesh network is constituted by bridges with one bridge for each radio operated device the mesh network is controlling. It is further within the scope of the present invention that one bridge may support multiple radio communication protocols, and can connect a plurality of radio-controlled devices to the mesh network.

Figures 6, 7:
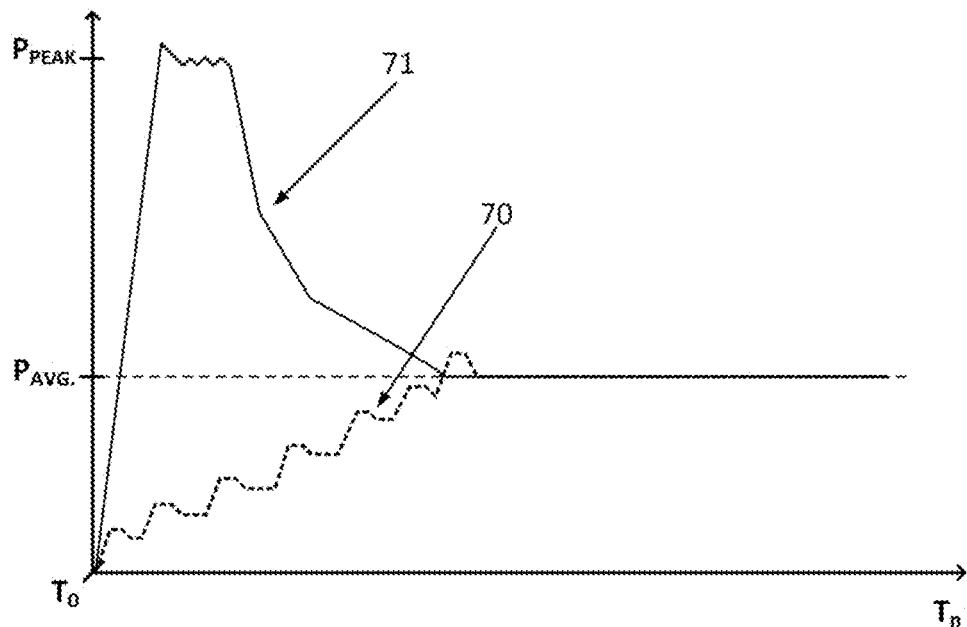
FIG. 6 illustrates an example of an operation between devices according to the present invention.
FIG. 7 illustrate an example of load switching according to the present invention.

In an example of embodiment of the present invention, as illustrated in FIG. 1, a controlling unit denoted CU 100 allows a user to specify interconnections between devices, or define actions to be performed on the devices at a given time, in a specific sequence or because of an input to the controlling unit. The allowed interactions between two devices or a plurality of devices is defined in an Interaction Matrix (IM) 60 as illustrated in FIG. 6. The CU 100 will then perform autonomous operations and control of the devices according to rules of interconnections defined in the IM 60.

With reference to US 2013/0114582 A1, disclosing a gateway (GW) supporting multiple RF protocols, has one point of RF connection for each respective protocol. Multiple radio transceivers are embedded within the same unit and with limited physical distance between frequency sources (transmitters) and radiating antennas might cause radio interference and spurious as discussed above.

Figure 14:
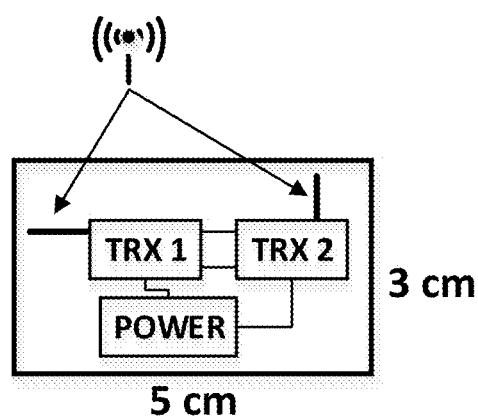
FIG. 14 illustrates a possible hardware implementation of a bridge with antenna orientation minimizing the coupling between the antennas.

Further, in addition to be designed according to official radio communication standards, a design of a wireless device with multiple radios and antennas will inherently be prone to interference between signals emitted by the respective antennas. The reason is simple, a limited size of the device may make distances between antennas too short to avoid the interference problem. FIG. 14 illustrates an example of a layout of antennas of a bridge according to the present invention. The illustration indicates that the respective antennas of a first transmitter is oriented orthogonal to the antenna of a second transmitter of the same bridge, which for example is implemented on a printed circuit board of 5 cm length×3 cm width.

Retrofit of new radio protocols in such a GW requires adding a new physical radio transceiver (TRX) to the GW or replacing the entire GW. Further, both solutions is adding extra cost to keep an existing GW up to date when new standards are introduced into the market. Existing smart GWs with a fixed set of RF transceiver cannot easily be scaled without adding a new TRX, requiring conformance testing according to for example norms like ETSI EN 300 220 and −328 radio emission standards.

Changing the hardware and/or software in the GW to be able to support the new radio might also require new functional conformance-testing, for example to be in conformance with Bluetooth SIG of already existing radios in the CU, in case unexpected effects are introduced. An example of prior art with multiple TRXs in one unit, is:

Lesswire HWC: http://www.lesswire.com/en/products/connected-home-systems/connected-home/hwc/overview/

On the other hand, CU 100 controls interoperations between wireless devices and is connected to the mesh network 120 in one connection point (thereby all communication in the mesh network 120 is visible to the CU 100) and may be further connected to external systems over internet protocols. A wireless device is connected to the mesh network 120 via a bridge that in one end is connected to the mesh network 120 and in the other end to the wireless device. A radio communication protocol translator located inside the bridge adapts the device to the mesh radio protocol. The CU 100 controls how a device interoperate with another device in the mesh network 120. By physically distributing bridges with a larger distance between them around in a building for example, any interference problems between multiple transmitters are avoided. The effect of connecting the CU 100 in one point is to allow the CU 100 to see all communication in the mesh network. It is within the scope of the present invention that other connection schemes providing the same technical effect of making all communication in the mesh network visible to the CU 100 can be used in embodiments according to the present invention.

Adding a new device is simple, install the respective bridge and connect the device to the bridge. Then add the device into the IM 60 matrix of CU 100 together with definitions of allowed functionality.

Each bridge is not intended to connect to a computer network, but connects only between the two radio protocols. Each protocol can be either mesh or point to multipoint protocols.

With reference to FIG. 6, interconnections 64 defined in the IM 60 can be between devices at a semantic level (refer for example The Open Connectivity Foundation (OCF) for further definitions of semantic level), regardless of their functionality and underlying protocol. On the left hand side of the table, there is a list of devices numerated as D1, D2, etc. On the right hand side are interconnections defined by listing the device IDs being part of the respective interconnections. For example, D2 have defined interactions with D1, D6 and D7. The other attributes of IM 60 are a collection of device characteristics. For example, device protocol (P1, P2 etc.), geographical location (A, B, C etc.), device ID (identity 1, 2, 3 etc.), device type (T1, T2, T3 etc.), related bridge ID (identity B1, B2, B3 etc.) and received signal strength indicator (RSSI) value (−38, −87 etc.) and load switching operation sequence number (1, 2, 3 etc.). One attribute can be an IPv6 address for the device, for seamless connection to external IP networks. The IM 60 will be able to define interconnections between devices using a same RF communication protocol as well as different RF communication protocols.

Examples of devices that could interoperate at a semantic level using the attributes and interconnections specified in the IM 60 could be:
- A KNX RF based actuator (e.g. Cherry Switches/ZF Energy Harvesting Wireless Switch or Dinuy Movement Sensor DM SEN R02), or smartphone application, controlling BLE and or Z-Wave based light bulbs.
- Interconnection between a KNX RF water monitor (e.g. Siemens QFP910) and a power switch to turn off the power in a room if water is detected.
- Defining a set of rules for identifying water leakage using Wireless M-Bus water meters measuring water consumption on deciliter level (e.g. Kamstrup Multical 21).
- Using motion detectors, light switches and light bulbs, regardless of underlying RF protocol, to achieve advanced light control.

Figure 4:
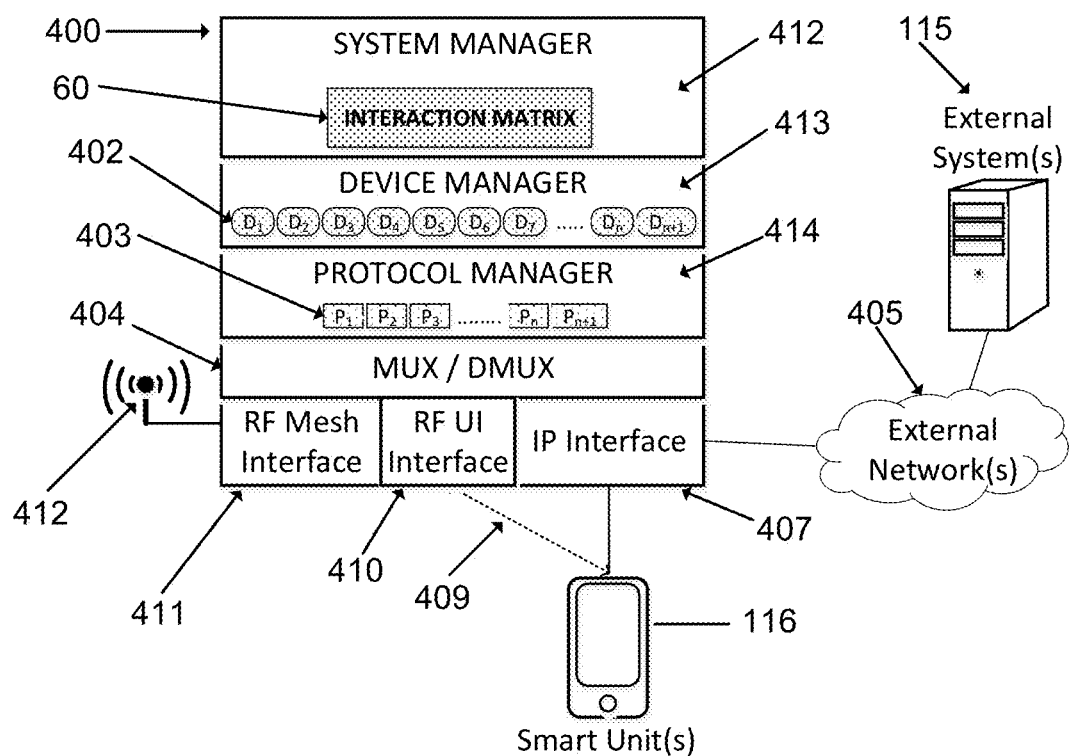
FIG. 4 illustrates an example of a system component, CSA, in the example of embodiment illustrated in FIG. 1.

FIG. 4 illustrates a Controlling Software Application (CSA) program 400, which is configured to be executed on the CU 100. Then the CU 100 is handling the IM 60 and connections towards external networks 405, external systems 115, the RF mesh interface 411 and local connections (e.g. TCP/IP 407 or Bluetooth 409, 410), allowing the user to configure and update the system using at least one smart unit 116.

Figure 9:
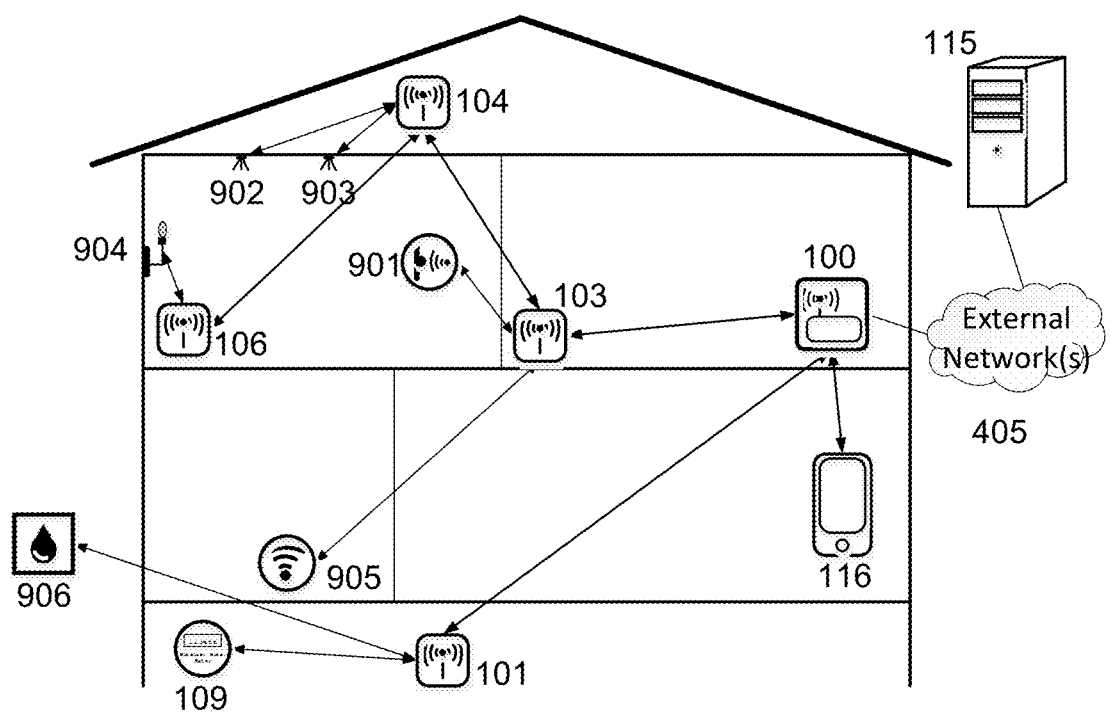
FIG. 9 illustrates an example of a house with various lighting devices being turned on or turned off.
Figure 10:
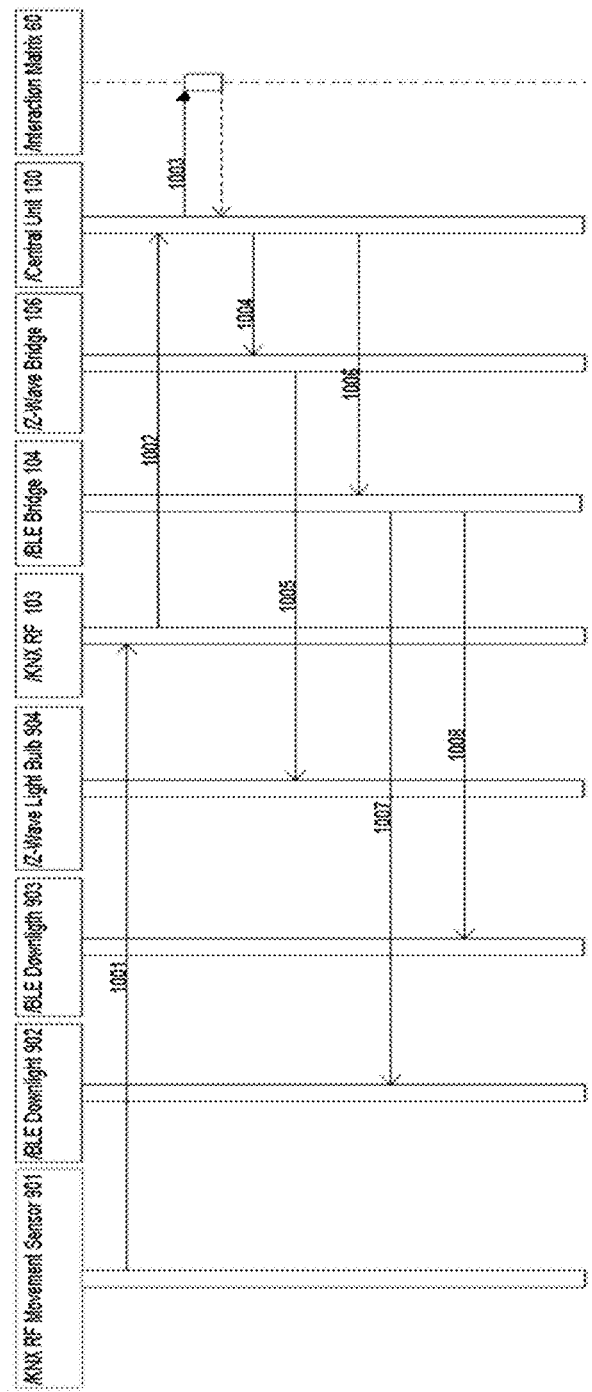
FIG. 10 illustrates the sequence of messages for operation of devices in FIG. 9.

FIGS. 9, 10 and 11 illustrates an example of embodiment of the present invention illustrating how interoperation between different types of devices can be achieved. A Z-Wave light bulb 904 and Bluetooth Low Energy (BLE) downlights 902, 903 are controlled by a KNX RF Movement Sensor 901. All devices and their interconnections are defined in the IM 60 along with device- and type specific attributes. When the user moves around in the room, the Movement Sensor 901 sends a standardized KNX RF message 1001 to the KNX RF bridge 103. The KNX RF bridge 103 translates and embeds the KNX RF message payload into a mesh network package 1002. The CU 100 on the RF mesh interface 411 receives the mesh network package. The DMUX layer 404 of the CSA 400 will reassemble the packet if it is segmented/fragmented and pass it to the protocol manager 414. The Protocol Manager will decode the received packet and pass the data to the Device Manager 413 that in its turn transforms the data into a common interoperational format that includes device specific parameters. The System Manager 412 may then look up 1003 the interconnected devices 64 and their attributes from the IM 60 in order to deduce which operation to be performed. In this example, the Movement Sensor 901 is interconnected 64 to the BLE downlights 902, 903 and the Z-Wave lightbulb 904. The Z-Wave lightbulb 904 will perform a lights-on operation 1004, 1005, while the downlights 902, 903 will be switched on to a preset dim percentage 1006, 1007, 1008 defined by one of the attributes in the IM 60. The device handlers will determine the specific action to be performed per device. The further processing of the transmit data is handled by the next levels in the CSA 400 and transmitted to the devices.

The device handler for the Movement Sensor 901 in the example above can have internal timers restarting each time a movement has been registered by the device. If the timer times out, the device handler will issue a lights-off operation to the device manager 413. The lights-off operation will then be handled similar to the operation(s) described in the example above.

In an example of embodiment of the present invention, the CU 100 has one fixed point of radio connection 411, being a mesh network 120, wherein protocol converters 30, denoted bridges 101 to 106, translates each protocol and sends the data to and from the CU 100, using the mesh network as a backbone 120 and as disclosed in FIG. 1. Normally the mesh network 120 operates at one selected frequency providing the most optimum radio performance. For supporting redundancy and/or multi-channel operation of more than one device, wherein each is operating on different channels, the CU can be equipped with more than one radio connection, one for each channel.

Figure 2:
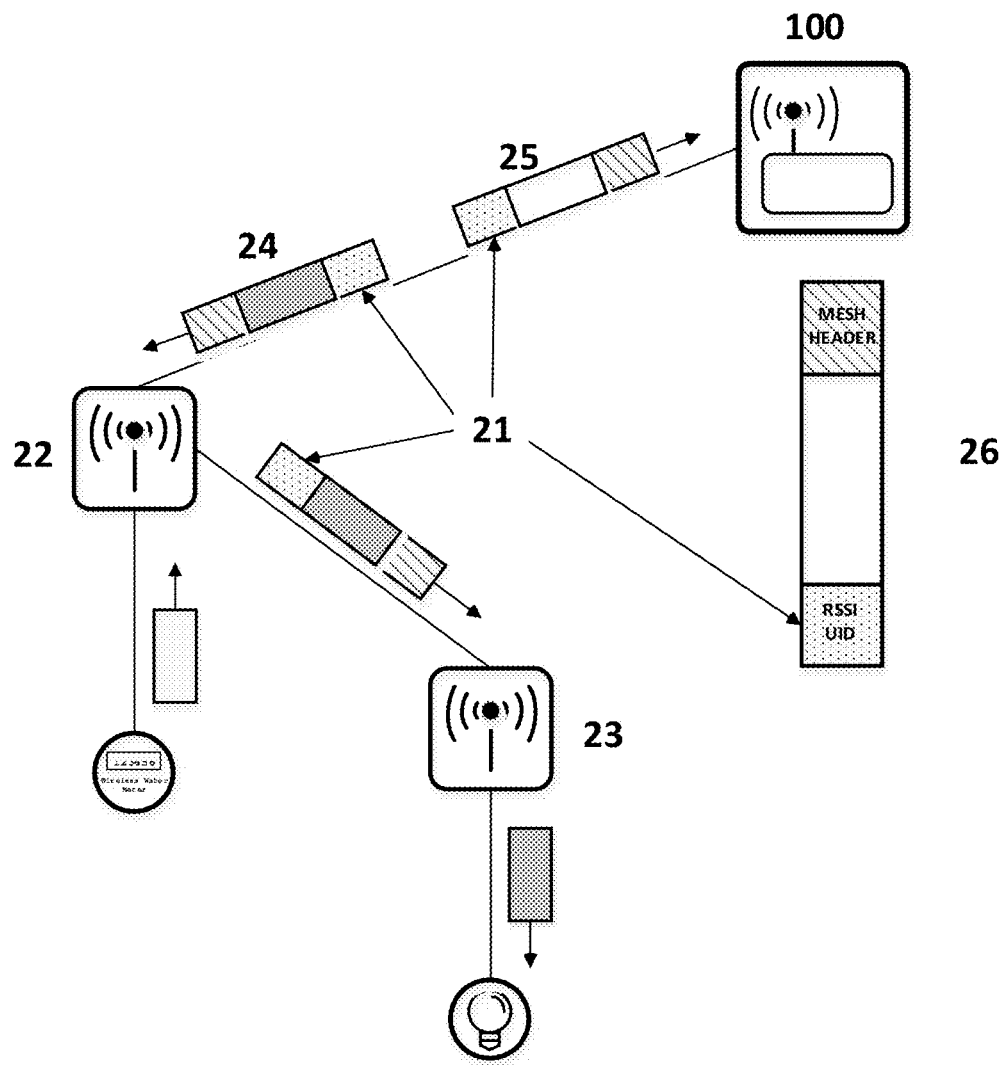
FIG. 2 illustrates an example of communication in the example of embodiment illustrated in FIG. 1.
Figure 3:
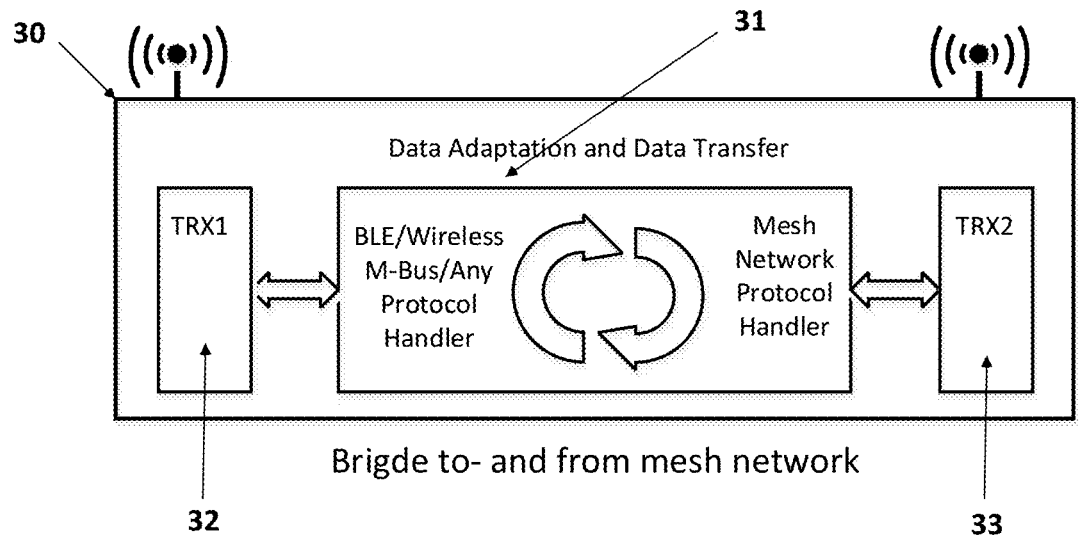
FIG. 3 illustrates the bridges in example of embodiment according to the present invention.

FIG. 2 illustrates how bridges 22, 23 support the translation of at least one specific radio protocol, encapsulating connection and protocol parameters, like unique ID of the bridge and connectivity metric 21, in the mesh data packets 24, 25 to and from the CU 100. For example, IPv6 addressing is supported by the bridges throughout the mesh network 120 enabling end-to-end IP connectivity for devices interacting with the CU 100, external systems 115 or peer devices. The bridges 22, 23 participate in the forming and healing of the mesh network 120, and a bridge 22, 23 can act as a router for other bridges within the mesh network 120. According to an example of embodiment of the present invention, only bridges constitute the mesh network 120, while routers are optional.

A traditional point-to-(multi)point connectivity is usually limited by its simple network topology which is little flexible and the radio range is limited without introducing one or more repeaters. Even with repeaters, it will still be a fixed network, vulnerable to changes in the surroundings, usually requiring some extent of network planning during installation. A self-forming and self-healing mesh network 120 introduces flexible transmission paths in the network and overcome limitations with fixed point-to-(multi)point networks having a limited number of hops. Examples of such networks are routing considerations and protocols for mesh topologies defined by the IETF 6LoWPAN working group and Tinymesh by Tiny Mesh AS [1]. In Tinymesh the forming and healing of the network is a fully autonomous operation.

As a further enhancement of the radio range performance and signal penetration, sub-1 GHz frequencies could be used within the mesh network 120. One possible implementation is that a bridge 101 to 106, in addition to the protocol translation, also converts from a high- to low radio frequency, which improves the limited radio range of for example, 2.4 GHz based protocols. The use of sub-1 GHz frequencies can optionally support RF channel parameters defined by IEEE 802.15.4g and CEPT ERC 70-03. The use of long range per hop mesh network 120, will enable an example of an embodiment of the present invention to facilitate deployments in a smart city/community and not being limited to indoor use.

In an optional embodiment of the present invention, at least one bridge of the mesh network (120), in addition to the protocol translation, converts the radio frequency of the radio of the at least one bridge being in communication with devices from a given high to a lower radio frequency, thereby increasing the radio communication range to a device adapted to the lower radio frequency.

In a further optional embodiment of the present invention, a first bridge in radio communication with a second bridge converts the radio frequency of the radio being in communication with the second bridge form a given high to a lower radio frequency, thereby increasing the radio communication range from the first bridge to the second bridge, wherein the second bridge is adapted to the lower radio frequency.

In an example of an embodiment of the present invention, support for additional protocols in the mesh network 120 is achieved by introducing a new bridge 105 into the system configured with the necessary protocol translation. Furthermore, the CSA 400 on the CU 100 may be updated and new interconnections and device configurations are defined in the IM 60. Any required radio qualification and certification is limited to the added bridge 105 only, limiting the cost and complexity of supporting new protocols. As an additional enhancement of the system, the added bridge will contribute to populate the mesh network 120 with extra routing capabilities.

Wireless systems in general eliminate the need for and cost related to wiring. Using a radio system as in examples of prior art, it may be necessary to populate a building or a facility with several GWs and or routers, in order to cover the whole area based on the radio performance of the system in question. In an example of an embodiment, where all the factors like mesh networking, sub-1 GHz radio frequencies, translation of any protocol in the bridges, and central interconnection and control of the devices, all contributes to reduced planning, —installation cost and —complexity. It also ensures long-term flexibility by the ability to include new protocols at any time with limited effort and cost.

The CU 100 hardware comprises of one RF interface for each mesh network 411, one optional short-range wireless interface 410 for supporting connectivity with smart units 116, and an IP interface 407 for connectivity towards smart units and external systems 115. It has at least one microprocessor for executing the CSA 400 and none-volatile memory for storing the content of the IM 60 and other application settings. The entire unit can be implemented for example in a physical device of width 5 cm, length 7 cm and height 3 cm. The device enclosure is normally manufactured in plastic so that the antennas for the various transceivers will be possible to implement inside the enclosure, without any connectors for external antennas. The device has a connector for power supply since battery operation will less likely be possible. It has also one connector for the IP interface, which normally will be a standard R345 connector. Power can optionally be provided over the IP interface connector.

FIG. 4 depict an example of the CSA 400 comprising several abstraction layers 404, 407, 410, 411, 412, 413, 414 handling a specific task in the system. The lowest layers 407, 410, 411, closest to the hardware, handle the transmission of data to and from the RF mesh interface 411, 412 or the IP interface 407. Internet IPv6 packets can be compressed as specified by the 6LoWPAN working group, describing encapsulation and header compression mechanisms that allow IPv6 packets to be sent and received over wireless RF networks. The MUX/DMUX layer 404 segments/fragments and reassemble mesh or IP packet data. Depending on the protocol used by the target device, the protocol manager 414 has a protocol specific handler 403, which handles protocol specific parameters and data, which are required by the bridges and the System Manager 412 in order to translate the payload to and from the device. Each device requires a device handler 402, which can maintain the status of the device in IM 60, perform device specific action/reaction, control and data management, data harvesting, and formatting data to and from the IM 60. The System Manager 412 performs all monitoring and control of devices and communication between devices, devices and the CU 100, devices and external systems and between the CU 100 and external systems based on the attributes, parameters and interconnections set in the IM 60. Furthermore, it performs administrative tasks, like initializing of the application, reading and writing of data to and from non-volatile memory, handling the user interface 116, scheduling and prioritizing of tasks, managing the IM 60, and software upgrade of bridges 101 to 106 and the CU 100.

The IM 60 may be implemented as a database comprising entries per device of relevant attributes 62 in order for the CU 100 to interact, control and maintain status of the respective devices. Attributes 62 are for example target protocol, device class, and supported functionality of the device, action/reaction sequences, connected bridge, geographical location, unique ID, RSSI value and interconnections 64 to other devices. When a new device is introduced into the system, the device is registered in the IM 60, the device parameters are updated and the system can adopt the device automatically based on known parameters of the device type. If the device type is unknown, it may be necessary to update the CSA 400. The user may further configure the device parameters, attributes 62 and interconnections 64 in the IM 60 before use. When a device changes status, the CSA 400 will check the status of the device and determine if the change of status requires an action/re-action on other devices based on the interconnections 64 between the devices, or convey the status to the user interface 116 and external systems 115.

In an example of an embodiment of the present invention, the bridges 30 comprises at least one target protocol transceiver 32 and at least one transceiver supporting the mesh network 33 towards the CU 100. The transceivers 32, 33 can be either separate chipsets or a combined solution using the same physical implementation. Transformation of the data to-and-from the devices using one of the supported target protocols and to-and-from the mesh network, is processed locally in the hardware of the bridge 31. If required, necessary protocol- and device information is provided from the IM 60 for the target protocol in question. The device payload including a unique ID for the device, device connectivity metric (e.g. RSSI) and unique ID for the bridge 30, and if required, target protocol overhead, is fitted into or extracted from the frame format 26 for the mesh network 120 in the exchange of data with the CU 100. For future updates and support of new features, the firmware 31 on the bridge 30 can be updated over-the-air using the mesh network 120. The entire unit can for example be implemented in a physical device of width 3 cm, length 5 cm and height 2 cm. The device enclosure will normally be made in plastic so the antennas for the various transceivers will be possible to implement inside the enclosure, without connector for external antennas. The device also has an optional connector for power supply.

FIG. 7 illustrates how high-power consuming devices will normally after a power outage, be switched on simultaneously, creating a large peak inrush current 71. The mains power supply may be dimensioned for the maximum total peak and not maximum average power consumption. In most cases, it is not possible for the power supplier to turn on or off such devices in a specific area or location in order to limit peak consumption.

In an example of embodiment of the present invention, radio controlled high-power devices can be switched on or off in a specific or random sequence. A specific, or random, time delay between each device can be specified by the attributes 62 in the IM 60, or controlled by an external system 115, in order to limit peak power consumption 72 or to regulate the total power consumption over a defined time within a defined location.

Figure 5:
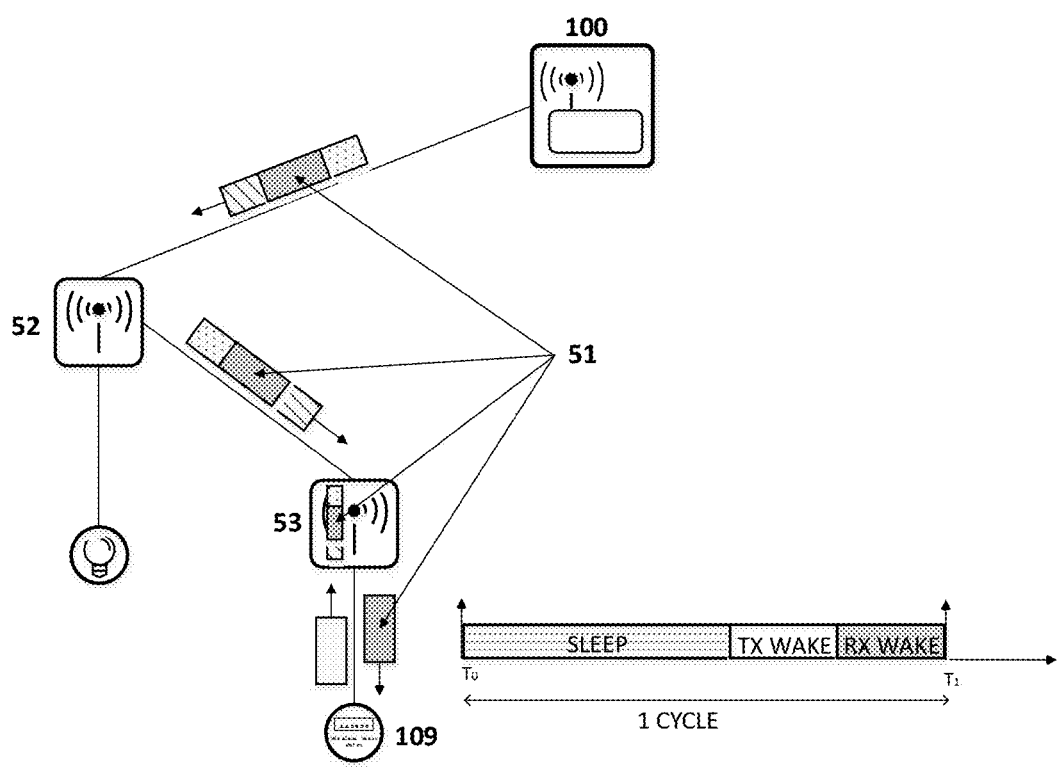
FIG. 5 illustrates an example of an application of a device according to the present invention.

FIG. 5 illustrates a type of battery operated device 109 being configured to be in a low-power sleep state, and will wake up only on regular intervals or on specific events, and having a very narrow transmit (TX) and receive (RX) time window. The narrow RX time window restricts the number of hops in a multi-hop network due to the inherent latency of the system. In most cases, the device can only be supported by a single hop solution. In an example of an embodiment, CU 100 can transfer pre-configured response data 51 to be stored in the bridge 53 and the bridge 53 can send the data within the RX time window of the device on the next wakeup.

Radio protocols can be divided into two major classes based on connectivity, which are connection-less protocols (CLP) 801 and connection-orientated protocols (COP) 802, and some protocols support both connectivity classes based on modes or context.

Connection-less protocols does not have any method or procedure to establish a logical link between devices and transmitted data may be considered broadcast (to all devices within range) or multicast (to a designated group of devices within range), and as soon as a CLP device have data to send, it will normally just be transmitted.

Connection-orientated protocols require a logical connection to be established between the devices before transferring data. This is generally accomplished by following a set of rules that specifies how a connection should be initiated, negotiated, managed and eventually terminated. In most prior art protocols, COP devices will establish a connection between each other in a peer-to-peer topology. The devices may store connectivity data for later sessions, but if one of the devices is moved to another location being outside radio range of the previously connected peer, it will not be able to connect or have to establish a new connection to a different peer device, and all previous session specific data may be invalid.

An example of a protocol supporting both CLP and COP data exchanges is BLE as known to a person skilled in the art. When a BLE peripheral device is not in a connection, it is denoted as a BLE advertiser or broadcaster, and when a BLE central device it not in a connection, it is denoted as a BLE scanner or observer. Connection-less data exchange in BLE is unidirectional, from the advertiser/broadcaster to the scanner/observer. When in a connection BLE supports duplex communication.

In an example of an embodiment depicted in FIG. 12, the CU 100, based on interactions with either external systems 115 or a smart unit 116, could instruct a specific bridge 85 or a group of bridges 86, 87, having a role as dynamic beacons, to advertise/broadcast a defined set of data to devices within range of the bridge. Examples of such datasets could be Apple iBeacon data, Google Eddystone beacon data or any custom data to be broadcasted.

In a further example of using bridges according to the present invention, data from a CLP device moving in a mesh network of bridges 120, wherein data received by one or more bridges within range of the device, will be transferred through the mesh network 120 to the CU 100. The bridges may apply filters for minimizing the traffic in the system, COP devices may be classified into two major classes: a) general type, or b) known to the bridge. A general COP device is a device where the device specific configuration and data set is unknown to the bridge and it will require a set of instructions from the CU 100 in order to interact with the device. A known COP device is a device where the configuration and how to perform data exchanges is already configured in the bridge and the task of creating a connection may not require involvement from the CU 100.

In a further examples of using bridges according to the present invention when a COP device not known to the bridges the COP device may enter into the mesh network, or is moving in a mesh network of bridges 120. One or more bridges in the mesh network is detecting the device. The bridges detecting the device is transferring the detection data to the CU 100. The CU 100 determines which bridge will engage in a connection with the device, and transfers necessary instructions and configuration data in order for the selected bridge subsequently to perform data exchanges to from the device and the mesh network.

In a further example of using bridges according to the present invention, when using a smart unit 116, the user may configure the IM 60 to relay certain types of broadcast data to relevant bridges. Further, specifying interconnections between COP devices thereby the COP devices are able to establish an apparent connection between each other using examples of embodiments of the present invention.

In a further example of using bridges according to the present invention, a bridge can support roaming of COP devices, operate as a dynamic beacon and for example be engaged in environmental control of temperature and lighting with the same configuration in the bridge. A beneficial aspect of this example, is that it would otherwise be necessary to utilize different bridges at the same physical location to achieve the same functionality as in this optional example of embodiment.

Using the BLE protocol as an example, the CU 100 can provide a BLE peripheral device in a bridge 85 with the advertising data to be transmitted, either to any listening BLE central or to a specific BLE central identified by for example the device's BLE MAC address. These connectivity data may also contain pairing and bonding information and encryption keys being obtained from a previous session on the same or on a different bridge. The CU 100 may also specify which bridge BLE central 86 should connect to an advertising BLE device, and the connectivity data may include previously negotiated pairing and bonding information and encryption keys obtained from the BLE central on the same or a different bridge 87. CLP devices will normally only transmit data when it is available or in certain intervals. However, only devices within radio range of the transmitting device would receive the data.

FIG. 8a depicts an example of how broadcast or multicast data may be relayed between the CLP devices 811, 812. A first CLP device, 811, is transmitting data which is received 813 by the bridge 85. The bridge forwards the data 803 to the CU 100. The CU 100 will then relay 804 the data to the second bridge 86, which in turn will transmit 814 the data so that it can be received by the second 812 CLP device, and vice versa. Using BLE as an example, the BLE advertiser 811 would broadcast 813 advertising data to the nearby bridge 85, which in turn sends 803 the advertising payload and device information to the CU 100. The CU 100 sends 804 the information to the bridge 86 which is in radio range of a BLE scanner 812. The bridge 86 takes the role of the advertiser and transmits 814 the advertising data to be received by the scanner 812. It is possible for a BLE bridge to act both as a BLE peripheral/advertiser and BLE central/scanner by using for instance a Nordic Semiconductor nRF51822 [2] and the S130 Softdevice [3] (BLE software stack). The S130 Softdevice supports one link peripheral and 8 link central at the same time.

If for example a body-worn COP device is moving within the network, the system can be configured to maintain data exchange with the device by handing over the connection to nearby bridges for optimal connection quality. This roaming is either handled by the CU 100 or autonomously by the bridges based on a set of predefined connection metrics.

FIG. 8b. 1) depicts two COP devices 88, 110, wherein the system may be configured to establish an apparent connection 808. The first COP device 88 establishes a connection 805 to a nearby bridge 85. The bridge 85 sends the connection data to the CU 100, which can deduct, based on attributes in the IM 60 and the connectivity data, to which device the connection was intended. The CU 100 will then instruct a nearby bridge 86 of the target COP device 110 to establish a connection to the device 110. The system will, when establishing a successful connection, relay the payload data between the COP devices 88, 110, which is assuming to be in apparent direct connection with each other.

For example, the CU 100 can transfer BLE connectivity data to a BLE central on one bridge and to a BLE peripheral on another bridge, making it possible for two BLE devices to establish a connection to their respective bridge and perform data exchange with the apparent peer BLE device.

Using BLE as an example, two BLE devices 88, 110 are exchanging data through their connected bridges 85, 86 and the CU 100 according to aspects of the present invention. The data to be exchanged is extracted by the firmware (FW) 31 from the GATT data base or the BLE stack on the transmitting device's connected bridge, and transferred to the receiving BLE device's connected bridge, which will perform the necessary transformation of the packet and insert the data into the GATT data base or BLE stack where after it is sent to the BLE device. This bidirectional data exchange can be handled in several layers in the BLE stack. It can either be handled by passing pure payload data on the application layer, or extracting BLE protocol (e.g. GATT, ATT, L2CAP, HCI) packets and passing it from one bridge to the other.

FIG. 8b 2) depicts roaming of the apparent connection 808 between two COP devices, as described in FIG. 8b 1). For example, if the second 110 device is moving out of radio range of the connected bridge 86, the CU 100 is configured to determine if the link quality has degraded below a certain threshold value, for example based on connection metrics like RSSI. The CU 100 can then decide that the bridge 86 should terminate or hand over the connection 806 and then transfer the connection data to a third bridge 87 via 804, 807. A new connection 810 to the second COP device 110 can be established and resuming the data exchange between the COP devices 88, 110 over the apparent connection 808, 809. During the period of this procedure, the connection to the first COP 88 device is not affected and the apparent connection 808, 809 between the devices is maintained even though the data exchange may have been affected by the procedure.

Devices, which are only roaming within the network, and is not being in an apparent connection with another device in the network, based on the type of COP device, roaming of the device is either performed autonomously by the bridges for known device types, or controlled by the CU for general COP devices.

Figure 8C:
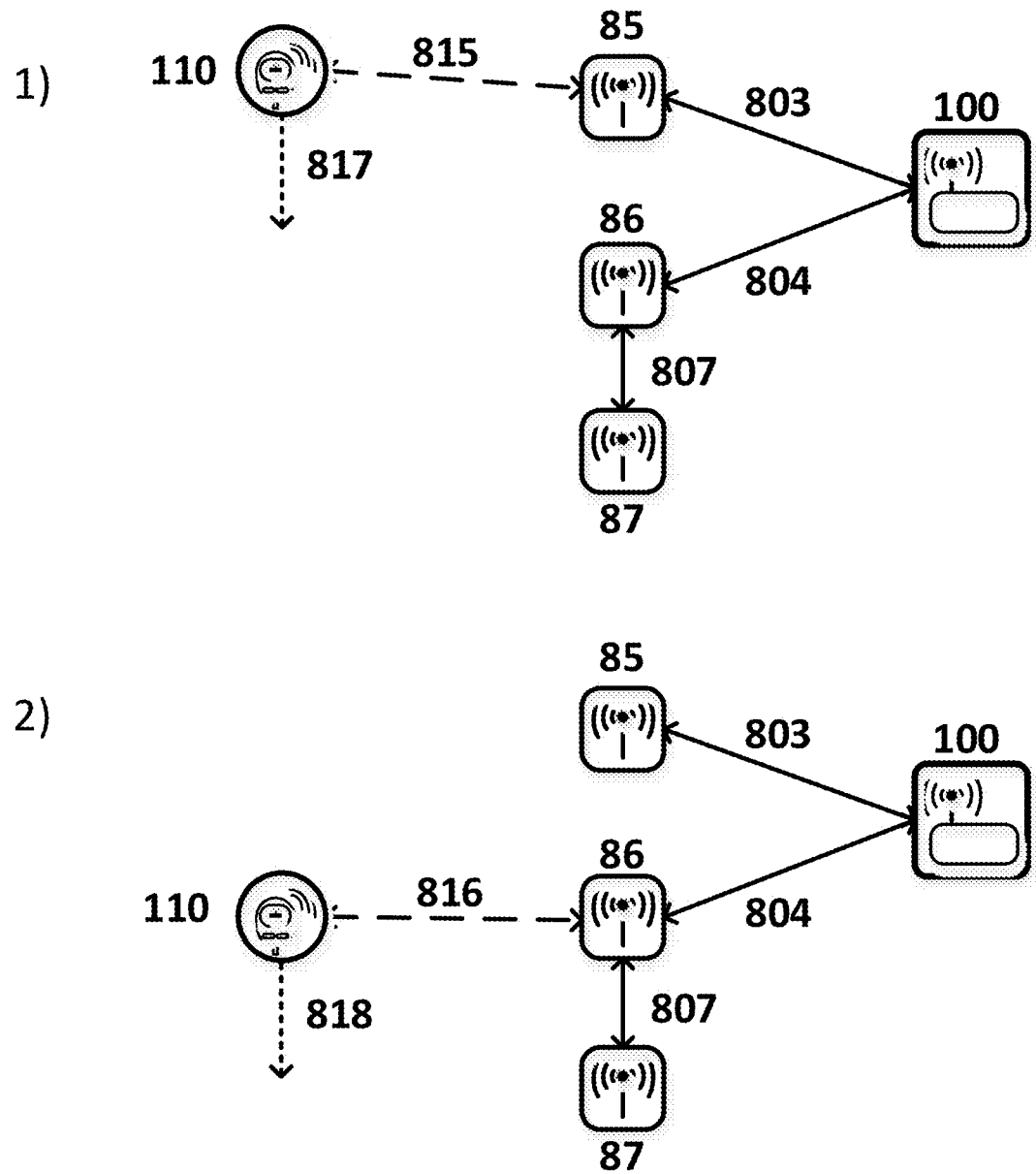

FIG. 8c depicts an example of an embodiment of the present invention wherein a COP device is roaming in the network and is exchanging data with the CU. In FIG. 8c) 1) a glucose meter 110 is engaged in a connection 815 with bridge 85 and is exchanging data with the CU 100 and is moving in the direction 817. In FIG. 8c) 2) the device has disconnected from the bridge 85 and has established a new connection 816 with the bridge 86 and has resumed the data exchange with the CU 100. The roaming procedure for a known device requires much less traffic in the mesh network 120 when performing the roaming operation.

Figure 13:
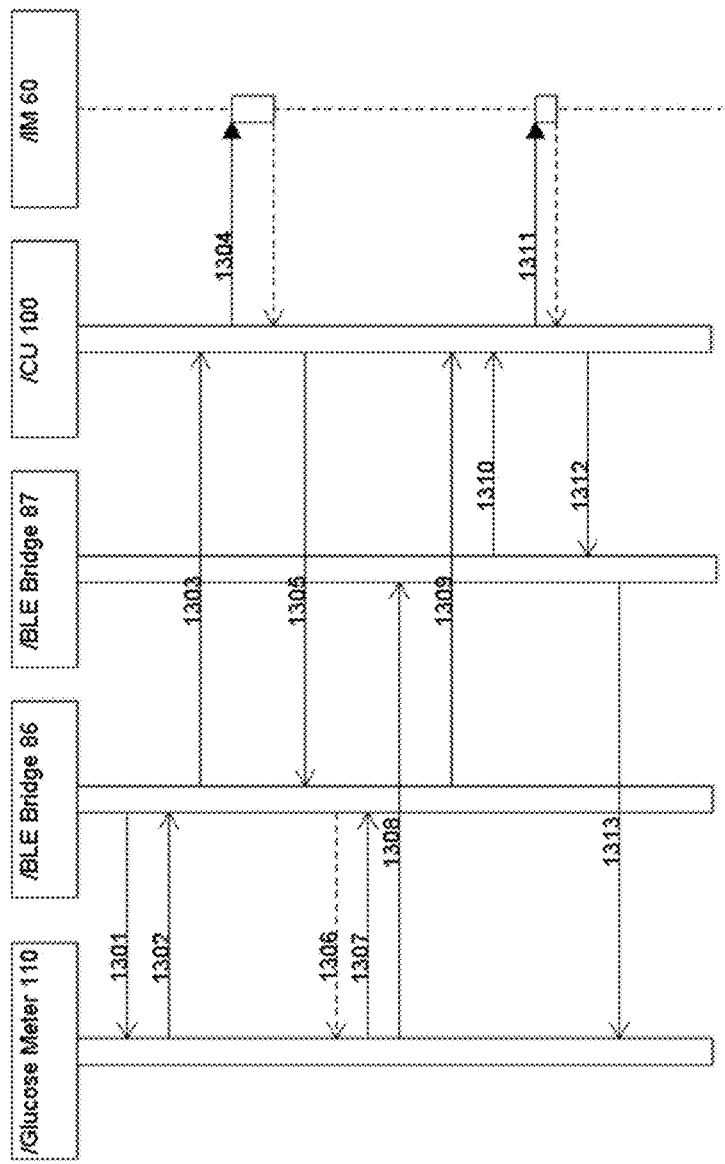
FIG. 13 illustrates the sequence of messages for operation of devices in FIG. 12.

FIGS. 12 and 13 illustrates an example of an embodiment achieving a roaming interoperation of a COP device between two bridges. A typical application is within welfare technology with personal connected health supervising devices. Two BLE devices, a Glucose Meter 110 and a Smart Device 88, is in an apparent connection 808. While the Glucose Meter 110 is moving 1201, the BLE bridge 86 is reporting 1303 the RSSI for the connected device to the CU 100 repeatedly, based on the responses 1302 to the BLE connection events 1301. Based on the RSSI, the CU 100 can determine if the link quality is below a threshold value 1304 defined in the IM 60, and if so, it will instruct 1305 the BLE bridge 86 to terminate the connection 1306 to the Glucose Meter 110. When the Glucose Meter 110 is disconnected, it will start BLE advertising 1307, 1308, being the same advertising packet, which is received by both the BLE bridges 86, 87. The BLE bridges 86, 87 will forward the advertising data 1309, 1310 to the CU 100, which looks up 1311 the bridges attributes, as threshold values, from the IM 60, to determine which bridge that may establish a new connection to the Glucose Meter 110. Based on these criteria, the BLE bridge 87 is instructed 1312 to establish a new connection 1313 to the Glucose Meter 110. During this whole process 1201, the actual connection 805 between the BLE bridge 85 and the smart device 88 is maintained, and from the perspective of the smart device, apparent connection 808, 809 is maintained.

In the case that the glucose meter 110 has a profile known to the bridge and or is certified according to recognized standards, as for example specified by the Continua Alliance, the data required to resume the connection on the second bridge can be a small subset of the connection data. In the event where there are several devices being roamed in the network, this procedure will ensure minimum latency when roaming the connections. If there are numerous Continua certified devices roaming in the system, it will ensure minimum bandwidth usage per roaming device.

In an example of roaming of a glucose meter 110 certified according to the Bluetooth SIG specified Continuous Glucose Monitoring (CGM) profile, and adopted by the Continua Alliance, a small subset of connection data is required to resume the operation of a second located bridge. The connection data could be the MAC address, pairing and/or bonding information and the characteristics and descriptors defined by the CGM Service.

In prior art, roaming of Bluetooth Basic Rate (BBR/Classic Bluetooth) devices in a clinical environment was performed using a custom implementation, including a master slave switch procedure and WIFI as backbone [4].

It is further within the scope of the present invention that the central controlling unit (100) may be configured to identify a route in the mesh network (120) towards a specific device (109, 110)

by using a connectivity metric (21), wherein the connectivity metric (21) is based at least on a unique identification indicator associated with the bridge (30) being in communication with the specific device (109, 110), and a received radio signal strength indicator value, indicating connectivity quality between the device and the bridge being in communication.

Further, the central controlling unit (100) may be configured with a configurable interaction matrix (60) providing addressable matrix elements being configured to define allowed and not allowed interactions between devices (109, 110).

Further, when adding a new bridge (30) into the mesh network (120), the addition may contribute in forming and healing the mesh network (120).

Further, at least one bridge (30) of the mesh network (120) may optionally be configured as a network router.

Further, when adding a new device (109, 110) into the system using a communication protocol previously not used in the mesh network (120), this may require:

adding a bridge (30) communicating with the new device (109, 110) and which is configured with a communication protocol translator adapted to the new communication protocol, and wherein any required radio qualification and certification is limited only to the added bridge (30).

Further, the central controlling unit (100) may further be configured to transfer connection specific data using known connectivity parameters:

the connection specific data is recorded in the interaction matrix (60) being data from at least a first located bridge, at least a second located bridge is receiving the connection specific data while at least one of the devices (109, 110) supported by the mesh network (120) is roaming between the at least first located bridge and the at least second located bridge.

Further, the specific connection data may comprise necessary specifications allowing two connection-oriented devices to maintain an apparent connection over the mesh network (120) when at least one of the connection-oriented devices are roaming.

Further, at least one connection-orientated device may comprise a configuration, or a set of data, enabling the connection-oriented device to resume the connection on a second located bridge when roaming out of range of a first located bridge.

Further, when the configuration and data sets of a connection-orientated device are known to a first bridge, the bridge may be configured to first autonomous establish a connection to the device and secondly thereafter enable the CU 100 to interoperate with the device and exchange data.

Further, when connection less devices are broadcasting data, the data received by the bridges may be transferred to the CU 100.

Further, wherein the central controlling unit (100) may be configured to prepare data to be stored in a bridge (30) in communication with a battery operated device (109, 110) configured with a narrow time-window for receiving data, and when the device announces its presence, the bridge will transmit the prepared data to the device.

Further, the central controlling unit (100) may be configured to communicate over an Internet Protocol network, wherein the central controlling unit (100) is configured to allow remote or local monitoring of the system, remote or local controlling of the system, and remote or local configuration of the system.

Further, wherein at least one identified bridge or a group of identified bridges may be configured, by the central controlling unit (100), to transmit a defined set of data to any device within radio range of the bridges.

Further, wherein the CU (100) may be configured with more than one radio connection, wherein each is operating on different channels, thereby providing redundancy and/or multichannel operations of more than one device.

Further, wherein at least one bridge of the mesh network (120), in addition to the protocol translation, may convert the radio frequency of the radio of the at least one bridge being in communication with devices from a defined high to a lower radio frequency, thereby increasing the radio communication range to a device adapted to the lower radio frequency.

Further, wherein a first bridge in radio communication with a second bridge may convert the radio frequency of the radio being in communication with the second bridge from a defined high to a lower radio frequency, thereby increasing the radio communication range from the first bridge to the second bridge, wherein the second bridge is adapted to the lower radio frequency.

Further, wherein bridges may be configured with filters minimizing traffic in the mesh network.

Although the present invention has been described in connection with the specified embodiments, it should not be construed as being in any way limited to the present examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference sign in the claims with respect to elements indicated in the figures should not be construed as limiting the scope of the invention. Furthermore, individual features mentioned in different claims, may possibly be advantageously combined, and the mentioning of these features in different claims does not exclude that a combination of features is not possible and advantageous.

Abbreviations

ATT Attribute Protocol (BLE)
BLE Bluetooth Low Energy (Bluetooth Smart)

BBR Bluetooth Basic Rate (Bluetooth Classic)
CGM Continuous Glucose Monitoring
CLP Connectionless Protocol
COP Connection-Orientated Protocol
CSA Controlling Software Application (application running on a micro controller on the device).
CU Central Unit
DMUX De-multiplexing
EN European Norm
FW Firmware
GATT Generic Attribute Profile (BLE)
GHz Giga Hertz
GW Gateway
HCI Host Controller Interface (BLE)
ID Identification
IETF Internet Engineering Task Force
IM Interaction Matrix
IP Internet Protocol
IPv6 Internet Protocol version 6
L2CAP Logical Link Control and Adaptation Protocol (BLE)
MAC Media Access Protocol
MUX Multiplexing
RF Radio Frequency
RSSI Received Signal Strength Indication
RX Receive
TCP Transmission Control Protocol
TRX Transceiver
TX Transmit
Wireless M-Bus Wireless Meter Bus
6LoWPAN IPv6 over Low power Wireless Personal Area Networks Definitions KNX RF Communications protocol for intelligent buildings.
Wireless M-Bus Protocol for smart metering.
NEXA Brand within wireless home automation products.
BLE Bluetooth Low Energy, communications protocol for power efficient smart devices. Trademark Bluetooth Smart.
BBR Bluetooth Basic Rate, which is the original Bluetooth protocol, also known as Classic Bluetooth.
Thread An IPv6 based protocol for "smart" household devices to communicate on a network.
Z-WAVE Wireless communications specification for home automation.
ZigBee Wireless communications protocol for personal area networks.
Beacon BLE devices that broadcast a defined dataset to any receiving device within radio range.
iBeacon Beacon protocol standardized by Apple to broadcast a universally unique identifier.
Eddystone Open source beacon standard defined by Google.

REFERENCES

[1] https://tiny-mesh.com/
[2] https://www.nordicsemi.com/eng/Products/Bluetooth-Smart-Bluetooth-low-energy/nRF51822
[3] https://www.nordicsemi.com/eng/Products/S130-Soft-Device
[4] MEDINFO 2015: EHealth-enabled Health (ISBN 9781614995647), page 198, Bluetooth Roaming for Sensor Network System in Clinical Environment https://books.google.no/books?id=OmZrCgAAQBAJ&pg=PA198&lpg=PA198&dq=bluetooth+roaming+japan&source=bl&ots=Gzi6z6nNtz&sig=kKL5ewQmdeyRTwpyLdIrqRBbFNY&hl=en&sa=X&ved=0ahUKEwi28J6-6d7NAhWCJSwKHZSmCZ8Q6AEINTAC#v=onepage&q=bluetooth%20roaming%20japan&f=false

The invention claimed is:

1. A centrally controlled radio communication system comprising a mesh network constituted by a plurality of radio controlled bridges, wherein a respective bridge is wirelessly connected to a respective device, wherein the respective bridges comprises a first radio controlled communication port in communication with the mesh network, and a second radio controlled communication port in communication with at least one connectionless device, or at least one connection-oriented device, wherein the respective mesh network bridges is configured so as to provide distributed protocol translation of respective radio communication protocols between the respective first and second radio controlled ports of the bridges enabling communication of mesh data packets over the mesh network between different devices,
    wherein mesh data packets comprise a payload including a device identity of the device the payload originates from,
    a central controlling unit CU, being connected in one point to the mesh network, is configured so as to receive and transmit mesh data packets to/from bridges in the mesh network, and is configured to execute a controlling software application program CSA,
    wherein, when the CSA is receiving a mesh data packet via a radio controlled mesh network interface, the CSA is configured to execute a set of abstraction layers, thereby the content of the mesh data packet from the bridge is made available to the CSA,
    the CSA is configured to use the device identity of the device the payload originates from to look up respective attributes stored in an interaction matrix IM, wherein at least one of the attributes is a device identity of at least one other device the device is configured to be allowed to communicate with,
    and to use the device identity of the at least one other device to look up in the IM at least a bridge identity of the bridge in communication with the at least one other device,
    and to look up further at least one attribute in IM defining allowed and not allowed interoperations between the devices,
    wherein the CU is configured to execute allowed interoperations between respective devices,
    wherein, dependent on the allowed interoperation between the devices, the CU is configured to transmit the received payload and/or commands in a mesh data packet to the bridge in communication with the at least one other device.

2. The system of claim 1, wherein the abstraction layers of the CSA comprises at least a multiplexer/de-multiplexer layer, a protocol manager layer, and a device manager layer,
    the multiplexer/de-multiplexer layer is configured to at least segment/fragment and reassemble mesh network packet data received via the radio controlled mesh network interface,
    the protocol manager layer is at least configured to handle protocol specific parameters and data of respective bridges,
    the device handler layer is at least configured to perform a device specific action of a specific device the device handler layer is configured to control.

3. The system of claim 1, wherein the IM is configured as a database, wherein an association between respective device identities and their respective attributes is listed.

4. The system of claim 3, wherein attributes of the IM comprises connection data providing necessary specifications allowing two connection-oriented devices to maintain an apparent connection over the mesh network, wherein a first one of the connection oriented devices establishes a connection to a nearby located bridge, wherein the bridge sends the connection data to the CU, and based on attributes in the IM and the connection data, which second connection oriented device in communication with the nearby located bridge will be initialized to be in the apparent connection.

5. The system of claim 3, wherein attributes of the IM comprises a configuration, or a set of data, enabling at least one connection-oriented device to resume a connection on a second located bridge when roaming out of range of a first located bridge.

6. The system of claim 1, wherein the CU is configured to receive and update the IM with device connection data from at least a first located bridge, wherein at least a second located bridge is receiving the updated connection data from the CU while at least one of the devices supported by the mesh network is roaming between the at least first located bridge and the at least second located bridge.

7. The system of claim 1, wherein the CU further is configured to identify a route in the mesh network towards a device, by using a connectivity metric, wherein the connectivity metric is based at least on the bridge identity of the bridge being in communication with the device and a received radio signal strength indicator value, indicating connectivity quality between the device and the bridge being in communication.

8. The system of claim 1, wherein adding a new bridge into the mesh network contributes in forming and healing of the mesh network, wherein an added bridge can act as a router for other bridges within the mesh network.

9. The system of claim 1, wherein at least one bridge of the mesh network is configurable as a mesh network router.

10. The system of claim 1, wherein adding a new device into the system using a communication protocol previously not used in the mesh network requires: adding a bridge communicating with the new device and which is configured with a communication protocol translator adapted to the new communication protocol, and
   wherein any required radio qualification and certification is limited to the added bridge only.

11. The system of claim 1, wherein configuration and data sets of a connection oriented device are known to a first bridge, the bridge is configured to first autonomously establish a connection to the device and secondly thereafter enable the CU to interoperate with the device and exchange data.

12. The system of claim 1, wherein connection less devices broadcasting data, wherein respective bridges receiving the data will transfer the data to the CU.

13. The system of claim 1, wherein the CU is configured to prepare data to be stored in a bridge in communication with a battery operated device, wherein the battery operated device is configured with a narrow time-window for receiving data, and when the device announces its presence, the bridge will transmit the prepared data to the device.

14. The system of claim 1, wherein the CU is configured to communicate over an Internet Protocol network, wherein the CU is configured to allow remote or local monitoring of the system, remote or local controlling of the system, and remote or local configuration of the system.

15. The system of claim 1, wherein at least one identified bridge or a group of identified bridges are configured, by CU, to transmit a defined set of data to any device within radio range of the bridges.

16. The system of claim 1, wherein the CU is configured with more than one radio connection, wherein each radio connection is operating on different channels, thereby providing redundancy and/or multichannel operations of more than one device.

17. The system of claim 1, wherein at least one bridge of the mesh network, in addition to the protocol translation, is configured to convert the radio frequency of the radio of the at least one bridge being in communication with devices from a defined high to a lower radio frequency, thereby increasing the radio communication range to a device adapted to the lower radio frequency.

18. The system of claim 1, wherein a first bridge in radio communication with a second bridge is configured to convert the radio frequency of the radio being in communication with the second bridge from a defined high to a lower radio frequency, thereby increasing the radio communication range from the first bridge to the second bridge, wherein the second bridge is adapted to the lower radio frequency.

19. The system of claim 1, wherein respective bridges are configured with filters minimizing traffic in the mesh network.

20. The system of claim 1, wherein the at least one further attribute defining allowed and not allowed interoperations between the devices is qualified by a state of the CU, wherein a change of the state of the CU can change a not allowed interoperation to an allowed interoperation, and vice versa.

21. The system of claim 1, wherein the at least one other device listed in the IM is a plurality of devices, wherein each respective interaction of each respective ones of the plurality of devices is configured to be executed in a random sequence, or in a time-synchronized sequence, or the sequence is controlled by an external system.

* * * * *